US006666403B1

United States Patent
Follensbee

(10) Patent No.: US 6,666,403 B1
(45) Date of Patent: Dec. 23, 2003

(54) FORCE-PRODUCING APPARATUS

(76) Inventor: Robert E. Follensbee, 13331 Lee Dr., Westminster, CA (US) 92683-2414

(*) Notice: Subject to any disclaimer, the term of this patent is extended or adjusted under 35 U.S.C. 154(b) by 0 days.

(21) Appl. No.: 10/072,774

(22) Filed: Feb. 11, 2002

(51) Int. Cl.$^7$ .............................................. B64C 29/02
(52) U.S. Cl. .................... 244/12.2; 244/23 C; 244/213; 244/73 B
(58) Field of Search ............................. 244/12.2, 12.3, 244/12.4, 12.5, 23 R, 23 A, 23 C, 23 D, 213, 215, 73 B, 73 C

(56) References Cited

U.S. PATENT DOCUMENTS

| 1,893,065 A | * | 1/1933 | Zaparka ..................... 244/215 |
| 2,468,787 A | * | 5/1949 | Sharpe ...................... 244/73 B |
| 2,812,980 A | | 11/1957 | Kadosch et al. |
| 3,276,723 A | | 10/1966 | Miller et al. |
| 3,297,278 A | | 1/1967 | Hawkins |
| 3,365,149 A | | 1/1968 | Willis |
| 3,489,374 A | | 1/1970 | Morcom |
| 3,612,445 A | | 10/1971 | Phillips |
| 3,785,592 A | | 1/1974 | Kerruish |
| 4,117,992 A | | 10/1978 | Vrana |
| 4,235,397 A | | 11/1980 | Compton |
| 5,003,770 A | * | 4/1991 | Schegerin et al. ......... 60/226.2 |
| 5,155,992 A | | 10/1992 | Follensbee et al. |
| 5,170,963 A | | 12/1992 | Beck, Jr. |
| 5,294,080 A | * | 3/1994 | Ross .......................... 244/215 |
| 5,347,808 A | * | 9/1994 | Standish et al. ........ 244/110 B |

* cited by examiner

Primary Examiner—Galen L. Barefoot
(74) Attorney, Agent, or Firm—Robert Louis Finkel

(57) ABSTRACT

A force-generating device employing a flared body and a surrounding shroud to define a duct of axially diminishing flow area defining a nozzle for accelerating and directing the discharge of a fluid at a cambered vane, a pressure dam depends from the bottom surface of the vane to entrap a portion of the fluid flowing chordwise along the bottom surface of the vane. A deflector formed on the enlarged end of the flared body and extending into the duct fluid outlet deflects the fluid stream to increase its velocity and direct it toward the vane. In another embodiment, a second deflector formed on the rim of the shroud and projecting into the duct deflects the discharge stream to further increase the velocity of the fluid stream and increase the angle of attack of the fluid stream impinging on the vane. In an alternative embodiment, the first shroud is enclosed in a second shroud to form a second duct of axially diminishing flow area defining a nozzle. The second duct directs its discharge against the bottom surface of the vane, thereby increasing the volume of fluid impinging against the pressure dam. The cumulative effect of these features is to increase and augment the lifting force produced by the vane, and at the same time enhance the efficiency, dynamic stability and directional control of the device.

24 Claims, 2 Drawing Sheets

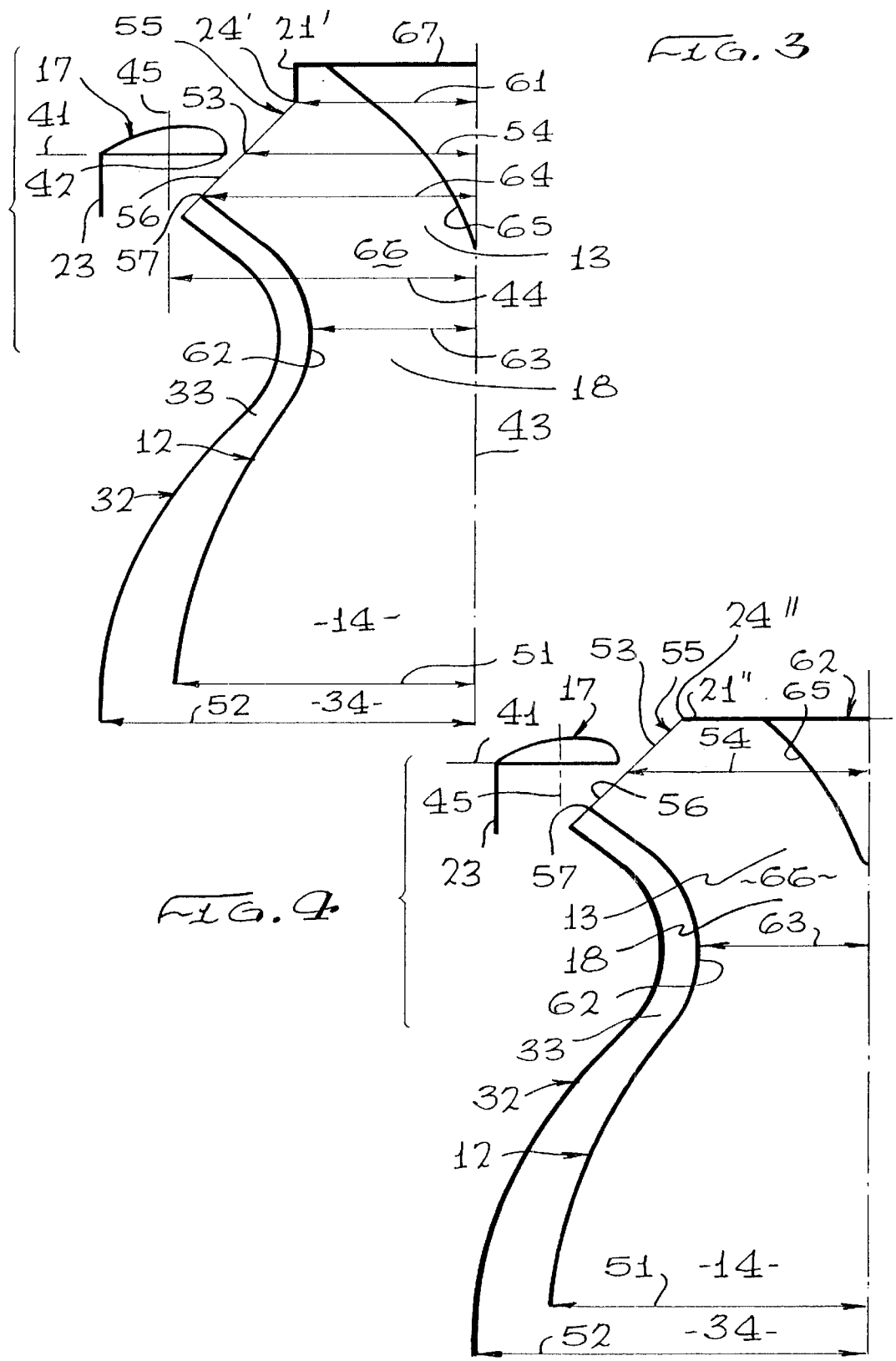

FORCE-PRODUCING APPARATUS

BACKGROUND OF THE INVENTION

1. Field of the Invention

This invention is related generally to apparatus for producing a force, and in particular to devices that employ ducted fluids flowing over an airfoil-shaped structure to generate lift, induce motion, or produce power. Still more particularly, it is concerned with methods and means for increasing the efficiency and enhancing the utility of such devices.

2. Description of the Prior Art

The use of shaped ducts for directing the flow of air, water, or other fluids over wing-like structures to generate or enhance lift is well known. A variety of designs embodying combinations of shaped ducts and airfoils have been proposed. Typical examples are illustrated by U.S. Pat. Nos. 2,812,980, 3,276,723, 3,297,228, 3,365,149, 3,489,374, 3,612,445, 3,785,592, 4,117,992, 4,235,397, and 5,170,963. Although promising on paper, few if any of these devices have proven successful in operation, much less commercially useful. Among their many deficiencies, most commonly three, namely, limited performance, low efficiency, and inherent dynamic instability, preclude them from serving a useful purpose.

Heretofore, as exemplified by the cited examples, conventional wisdom called for the use of ducts having axially expanding flow area. By definition, such ducts are diffusers and slow the flow of fluid discharged from them. U.S. Pat. No. 5,155,992, in which I am a co-inventor, discloses an alternative method and means employing a shaped duct and an annular cambered vane for generating a force. The patented invention utilizes a flared body enclosed in a shroud to form a duct terminating in an outlet of axially diminished flow area. A fan or impellor drives a fluid stream through the duct. Having a reduced fluid outlet, the duct defines a nozzle. Precisely opposite from a diffuser, a nozzle serves to accelerate the fluid discharge. The device is designed to direct the discharge over a cambered vane or wing positioned in the duct fluid outlet.

Tests have demonstrated the successful operation of the invention and confirmed its utility. I have discovered that by incorporating certain improvements, features and refinements in the patented device, I can greatly enhance its performance, efficiency and stability. The present disclosure relates to methods employing those improvements, features and refinements, to a force-producing apparatus embodying them, and to mechanisms, such as vehicles, employing.

SUMMARY OF THE INVENTION

The subject invention, or some of its features, may be applicable to other prior art devices, but it is intended primarily as an improvement in devices embodying the teachings of U.S. Pat. No. 5,155,992 to generate lift, induce motion, or produce power. Such devices serve a variety of applications. By way of example, they can be used to achieve vertical lift in VTOL/STOL aircraft, or to propel the rotor blades that provide lift for helicopters. Immersed, they can provide propulsion for surface or sub-surface vessels.

For illustrative purposes, several preferred embodiments of the invention will be described in conjunction with a force-generating device in which the vane and shroud embody the generally circular plan form shown in U.S. Pat. No. 5,155,992. In this configuration, the flared body is preferably generally conical, that is, radially symmetrical, in shape, and coaxial with the shroud. The lower end of the flared body extends into and overlaps the flared end of the annular shroud and with the overlapping portion of the shroud forms an annular duct of axially diminishing flow area. The converging walls of the duct define an annular nozzle. The vane, in this design a generally horizontally disposed annular cambered wing, is mounted to the duct in the path of fluid discharged radially outwardly from the nozzle.

In one of the preferred embodiments shown here, the invention comprises a first deflector in the form of an annular skirt mounted to the enlarged upper end of the flared body. This deflector extends outwardly of the flared body into the duct fluid outlet. A second deflector in the form of an annular flange mounted to the lip of the shroud and extending radially inwardly of the shroud (i.e., in the direction of the flared body) into the duct fluid outlet; and a structural feature that I call a "pressure dam" in the form of a flange depending generally normally from the bottom surface of the vane at or near its trailing edge. At least one of the purposes of the pressure dam is to entrap a portion of the fluid flowing chordwise along the bottom surface of the vane.

In another preferred embodiment of the invention, the shroud of the first embodiment is enclosed in a second shroud that, with the first shroud, forms a second, outer, annular duct (like the first duct a nozzle of upwardly diminishing flow area). The stream of fluid discharged by the annular fluid outlet of this outer duct is directed toward the bottom surface of the vane.

I am not certain as to the precise fluid-dynamic principles called into play by the invention, however, based on my test data, it appears that three functions are in operation: One, served by the first deflector, involves the compression of the fluid discharge and the resulting increase in the velocity of the fluid exiting the duct nozzle. Another, associated with the second deflector, involves the exercise of control over the angle of attack and distribution of the flow of the accelerated fluid mass under and over the cambered vane. The third, influenced if not determined by the pressure dam, has to do with the chordwise location of the region of impact of the fluid discharge against the lower surface of the vane. Individually, these functions offer marginal overall improvement in the operation of the patented device. Collectively, they produce a marked increase in the lift force generated by the device, noticeable improvement in its efficiency, and demonstrably enhanced stability and controllability. The provision of the second shroud appears to increase, and augment the control of, the flow of fluid across the bottom surface of the vane.

It will be understood that the subject invention, though illustrated and described in connection with an annular duct and vane, is readily adaptable for use with a force-generating device of other than annular configuration. By way of example, rather than conical, the flared body may be rectilinear in cross-section with the shroud or shrouds taking the form of curved sheets or surfaces spaced convergently or divergently from its flared wall or walls. FIG. 3 of U.S. Pat. No. 5,155,992 is illustrative of one such non-annular embodiment of the invention. The shape of the vane in such a device would be defined by the configuration of the shroud or shrouds and the flared body. In the non-conical variation of the invention shown in FIG. 3 of U.S. Pat. No. 5,155,992, a pair of straight vanes are positioned in the outlets formed at either side of the bilaterally symmetrical flared body. The pressure dam and first and second deflectors, of course, would conform to the configuration of the vane, the flared body, and the shroud or shrouds, respectively.

A principal object of the subject invention is to provide a method and means for maximizing the force produced by the cambered vane of a device of the type described in my earlier patent.

Another object is to provide a method and means, for use in a device of the type described, for directing the fluid exiting the duct nozzle efficiently under and over the cambered vane.

A further object is to provide a method and means, for use in a device of the type described, in which the velocity of the discharged fluid is increased as well.

Another object is to provide a method and means, for use in a device of the type described, incorporating a pressure dam for increasing the force generated by the fluid impinging on the lower surface of the cambered vane.

Still another object is to provide a method and means, for use in a device of the type described, in which the acceleration and directional control of the fluid are achieved by adjusting the configuration of the duct and its fluid outlet.

A still further object is to provide such a method and means in which the configuration of the duct and fluid outlet are established by a combination of deflectors mounted to the flared body and its surrounding shroud and extending into the duct fluid outlet.

Another object is to provide a method and means, for use in a device of the type described, which incorporates a second annular duct nozzle for increasing the velocity of and directing the discharged fluid impinging on the bottom of the cambered vane.

An additional object is to provide methods and means of the type described for use in force generating devices of other than annular configuration.

Yet a further object is to provide a method and means, for use in a device of the type described, that utilize in combination the configuration of the fluid-containing duct, fluid deflectors associated with a tapered central body and its enclosing shroud, and a pressure dam on the bottom surface of the vane, for maximizing the force generated by, and improving the stability, directional control, and efficiency of, such a device.

Still another object is to provide a method and means, for use in a device of the type described, for generating a force that overcome the deficiencies inherent in the prior art shaped-duct lift-generating devices.

For a fuller understanding of the invention and the manner and means by which it achieves these and other objects and advantages which will become apparent to those skilled in the art, reference is made to the following detailed description of the preferred embodiments illustrated in the accompanying drawings, in which:

BRIEF DESCRIPTION OF THE DRAWINGS

FIG. 3 is a diagrammatic side view of one half of the embodiment of the invention illustrated in FIG. 2, illustrating the dimensions employed in defining a mathematical model of the invention; and FIG. 4 is a diagrammatic side view of one half of an alternative embodiment of the invention illustrated in FIGS. 2 and 3.

Wherever practicable, the same numeral is used to identify identical or substantially similar features appearing in the several figures.

DETAILED DESCRIPTION OF THE PREFERRED EMBODIMENTS

Figure 1:
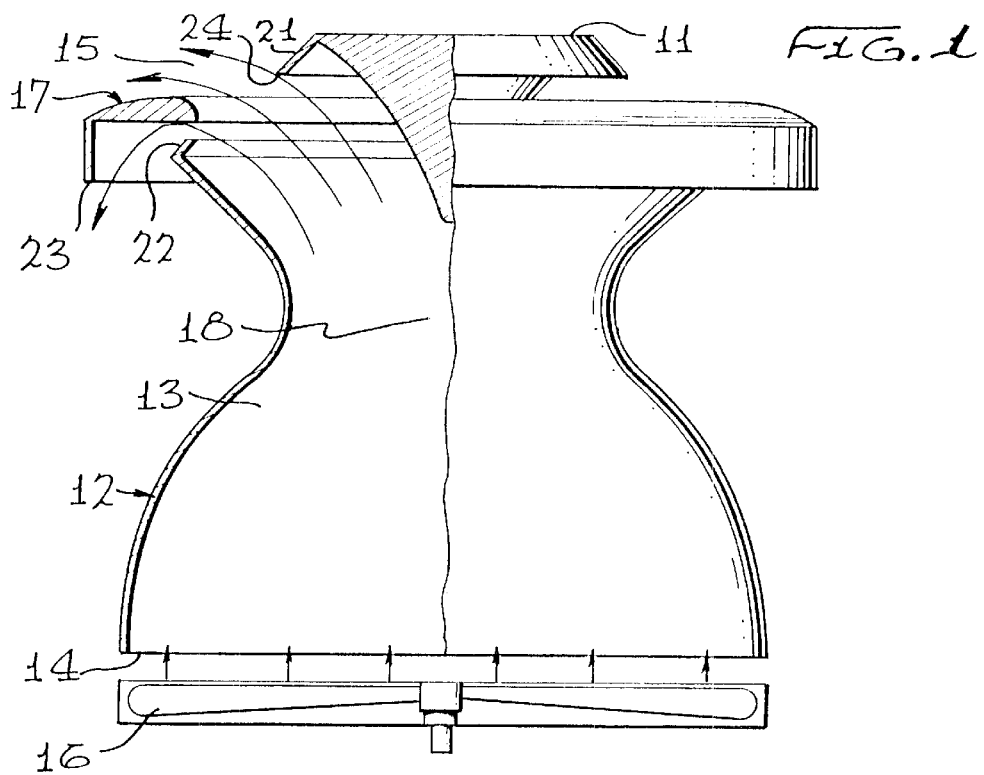
FIG. 1 is a side elevational view of a force-generating device in accordance with the subject invention with portions of the device cut away to show its internal construction.

FIG. 1 illustrates the subject invention embodied in a device of the type described in my U.S. Pat. No. 5,155,992 as it might be used to provide lift for a VTOL/STOL aircraft. The device comprises a flared, in this instance generally conically-shaped, body 11 and a contoured, similarly flared annular shroud 12. The concentrically mounted body 11 and shroud 12 define an annular duct 13 having a fluid inlet 14 and a fluid outlet 15. The device is constructed with the inlet flow area of fluid inlet 14 substantially greater than the flow area of the duct fluid outlet 15 at the outlet of duct 13.

For comparative purposes, the inlet flow area is defined as $\pi D^2/4$, where D is the diameter of fluid inlet 14. The outlet flow area is equal to $C_{15}W$, where $C_{15}$ is the length of the fluid outlet (the circumference of fluid outlet 15 in the annular embodiment shown here) taken at the midpoint of the outlet, and W is the width of the outlet (in this instance, the width of the opening measured from the outer edge of deflector 22 to the lip 24 of deflector 21. It will be noted that the flow area of a fluid duct, for example, annular duct 13, is not the same as the cross-sectional area of the duct.

Energized fluid, here air, from a source such as compressor 16, is further compressed and accelerated as it passes through duct 13. The high-velocity discharge from nozzle fluid outlet 15 impinges on the leading edge of concentrically mounted annular cambered vane 17, thereby producing upwardly directed lift.

The subject invention comprises three components: a first deflector 21 in the form of an annular skirt mounted to the upper end of the flared body 11, a second deflector 22 mounted to the upper edge of shroud 12, and a pressure dam, here in the form of a flange 23 mounted rigidly to the lower surface of vane 17 at or near its trailing edge. Deflector 21 extends radially outwardly of the flared body 11 into the duct fluid outlet 15, effectively acting upon the fluid stream so as to change its flow direction and further accelerate the discharged fluid virtually at the point of its impingement with vane 17. It should be pointed out that while the first deflector 21 is shown extending normally of the surface of body 11, the desired effect can be achieved by mounting deflector 21 to body 11 by means of a cap (not shown in FIG. 1) from which the deflector 21 depends vertically, rather than normally of the surface of the flared body 11, the significant factor being the spatial location of the lip 24 which defines the effective aperture of fluid outlet 15. This alternative arrangement is depicted in FIG. 2.

The second deflector 22 plays a significant though not vital role in the performance of the invention. For convenience, if desired it can be omitted. When deflector 22 is included, it appears to serve two functions: first, it accelerates the flow of fluid through the fluid outlet nozzle and over vane 17 as previously described in connection with deflector 21. Secondly, in deflecting the fluid toward the center of shroud 12, it effectively increases the angle of attack of the flowing fluid with respect to vane 17. The result is to increase the lift produced by the vane 17.

The pressure dam created by flange 23 appears to increase substantially the lift generated by vane 17. I assume it does so by entrapping at least a portion of the air mass impacting the lower surface of vane 17 and thereby creating an overpressure acting upwardly against that surface. Unlike the numerous well-known conventional aircraft wing flaps, the pressure dam does not appear to rely on an increase in the camber or outer surface area of vane 17 for its enhancement of the lift provided by vane 17.

Figure 2:
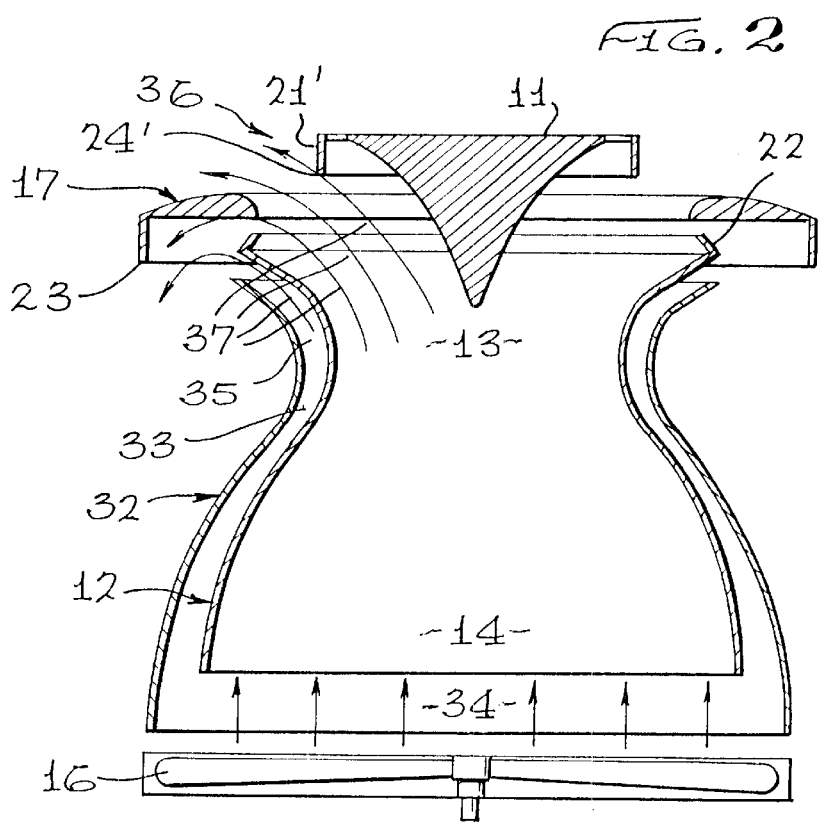
FIG. 2 is a side sectional view of an alternative embodiment of the invention illustrated in FIG. 1.

In the embodiment of FIG. 2, a force-generating device of the type illustrated in FIG. 1 is provided with a second contoured shroud 32 mounted (by conventional means not shown) to the first shroud 12. The two shrouds 12, 32 effectively define a second duct 33 having a fluid inlet 34 of greater flow area than the fluid outlet 35 at the outlet of duct 33.

Fluid inlet 34 is operatively connected to a source of fluid under pressure, preferably the same source, compressor 16, supplying pressurized fluid to fluid inlet 14 of the first duct 13. Fluid outlet 35 is configured and oriented to direct the stream of high-velocity fluid discharged from duct 33 against the bottom surface of vane 17, thereby increasing the overpressure accumulated in front of flange 23.

As noted earlier, first deflector 21' is mounted to flared body 11 by means of an annular cap 36. In this construction, the deflector 21' is vertical, rather than inclined as in the embodiment of FIG. 1. Since the lip 24' of deflector 21' is in the same spatial position with respect to body 11 as the lip 24 in the construction of FIG. 1, the function and effect of deflector 21' are precisely the same as those of deflector 21. What I believe are the principal airflow paths 34 for the two embodiments are depicted diagrammatically in FIGS. 1 and 2.

From test data, I have been able to synthesize a mathematical model representing a successful design embodying the subject invention. The model is defined by a series of dimensional relationships, which are independent of scale and are equally valid for large as well as small craft.

Referring to FIG. 3, the mathematical model design assumes the annular vane 17 is a circular wing disposed on a horizontal plane 41 containing the leading edge 42 of the wing airfoil. The particular airfoil is a matter of choice and forms no part of the invention. The center of circular vane 17 is the vertical centerline 43 of the model. For the most part, the pertinent dimensions are taken from horizontal plane 41 and vertical centerline 43 and encompass a range of values for each parameter.

For modeling purposes, I base the wing area on a target wing diameter. Conveniently, the wing aspect ratio may be from about 10 to about 20 and preferably, for this example, 17.8. Given a design wing diameter and the aspect ratio for the selected wing, the wing area can be readily calculated using conventional aerodynamic principles, equations, and formulas.

The wing radius 44 is measured from the center 45 of the wing chord to the model centerline 43.

The inlet radius 51 of the fluid inlet 14 of inner shroud 12 is equal to or greater than the radius 44 of vane 17. The depth of duct 13 from the fluid inlet 14 to the narrowest region, throat 18, is about 1.25 times the inlet radius 51 of fluid inlet 14. The inlet radius 52 of the fluid inlet 34 of the outer shroud 32 is greater than inlet radius 51 of inner shroud 12, the difference being dependent at least in part on the volume of fluid flow desired in the second duct 33.

The total effective area of nozzle fluid outlet 55 is designed to be from about 0.80 to about 1.00, and preferably about 0.89, of the effective area of vane 17. The (inner) shroud 12 and deflector 21' are configured to position the center 53 of fluid outlet nozzle 55 in the horizontal plane 41 at a radius 54 from centerline 43 defined as from about 0.85 to about 0.95, and preferably about 0.93 of the distance from centerline 43 to the leading edge 42 of vane 17. The total fluid outlet nozzle opening is calculated from the fluid outlet nozzle area and its radius 54.

The radius 61 of lip 24' of deflector 21' (or lip 24 of deflector 21) is from about 0.80 to about 0.90, and preferably about 0.80 of fluid outlet nozzle radius 54. The end of a line segment 56 drawn from lip 24' through, and an equal distance beyond, the center 53 of fluid outlet 55 defines the location of the lip 57 of inner shroud 12, or the lip of the second deflector 22, if this feature of the device is provided (omitted from this embodiment of the invention). In either case, the lip 57 of inner shroud 12 or the lip of the second deflector 22 overlaps, that is, extends radially outwardly of the leading edge 42 of vane 17.

The inner wall 62 of shroud 12 adjacent nozzle fluid outlet 55 is oriented at from about 40° to about 45° and preferably about 40° with the horizontal plane 41. This is the geometric angle of attack of the vane 17 to the duct airflow.

The throat radius 63 of inner shroud 12 is from about 0.60 to about 0.70, and preferably about 0.67, of the radius 64 of shroud lip 57.

The surface 65 of flared body 11 is generally parallel with the inner wall 62 of shroud 12. The annular duct 66 defined by flared surface 65 and shroud wall 62 has a "depth" or effective opening of from about 1.10 to about 1.5, and preferably about 1.37 times fluid outlet nozzle opening 55. The depths of deflectors 21 (see FIG. 1) and 21' (of FIG. 2) are defined as percentages of the fluid outlet nozzle opening 55. The deflectors 21 and 21' have an effective depth (measured along the extended fluid outlet nozzle opening 55) of from about 0.25 to about 0.5, and preferably about 0.43 of fluid outlet nozzle opening 55. From this dimension, the vertical distance from the lip 24' of the deflector 21' to the top surface 67 of flared body 11 can be calculated.

The flange 23 depends vertically from the bottom surface trailing edge from about 0.50 to about 0.75, and preferably about 0.50 of the length of the chord of vane 17. As mentioned earlier, flange 23 serves as a pressure dam positioned directly in the path of fluid exiting the outlet nozzle, e.g., 55. The force resulting from the impact of outlet fluid with the flange 23, or from the pressure differential on opposite sides of flange 23, or both, demonstrably increases the thrust produced by vane 17. While the thrust-producing mechanism is not fully understood, it unquestionably contributes significantly to the overall capacity and efficiency of the invention.

From the results of my experimentation with deflectors of various configurations, it appears that one, and perhaps the most, significant function of the deflectors 21 (FIG. 1) and 21' (FIGS. 2–3) is the positioning of lips 24 and 24', respectively, with respect to the lip of deflector 22 (FIGS. 1–2) and lip 57 of inner shroud 12. Lips 24 (FIG. 1) and 24' (FIGS. 2–3) and the lip of deflector 22 (FIGS. 1–2) and lip 57 (FIG. 3), respectively, effectively define the size and geometry of nozzle fluid outlets 15 and 55.

FIG. 4 illustrates an alternative embodiment of the invention that takes advantage of this principle. Here, deflector 21" is a flat, annular ring, mounted to the flared body 11. Were weight not a consideration in the construction of the device, deflector 21", rather than an annulus, could take the form of a flat, circular plate (not shown) secured to the top of the flared body 11. In either case, the lip 24" of the deflector 21" is substantially in the plane of the deflector 21", rather than at the periphery of a flange spaced or offset from a plane containing a portion of the deflector as in the embodiments of FIGS. 1–3. Significantly, it will be noted that annular lip 24" at the periphery of deflector 21" is located in the same spatial relationship with the structural elements defining fluid outlet nozzle 55 as lip 24 bears to the elements of nozzle 15 in the embodiment of FIG. 1 and as lip 24' bears to the elements of nozzle 55 in the embodiments of FIGS. 2 and 3.

As with the embodiments of FIGS. 1–3, the effective "chord," i.e., the width or radius of deflector 21", is determined by the configuration of the surface 65 of flared body 11 and its intersection with the adjacent surface of deflector 21" that terminates at lip 24". The dimensions and geometry of deflector 21" define the effective radius 62 of lip 24" in the same manner as previously described in connection with the radii of lips 24 and 24' in the embodiments of FIGS. 1 and 2, respectively (not shown), and the radius 61 of lip 24' in the embodiment of FIG. 3.

Test results strongly suggest that the configuration and angular orientation of the deflectors 21, 21', 21", serve several functions bearing on the operation and efficiency of the invention: The first of these is the positioning of the lip 24, 24', 24" with respect to the lip of the deflector 22 in the embodiment of FIG. 1 or the associated lip 57 of shroud 12 in the embodiments of FIGS. 2 and 3, respectively. The spacing and spatial relationship of the respective pairs of lips effectively establish the size and geometry of the fluid outlet. In each of the embodiments, by "choking," i.e., constricting, the fluid outlet, the deflector is employed to define an exit nozzle. The velocity and flow rate (volume) of the fluid exiting the nozzle are determined, and can be selectively controlled by appropriate choice and adjustment of the configuration and orientation of the deflector 21, 21', 21".

A second function served by the deflectors 21, 21', 21" in a manner not fully understood is to enable or cause the fluid stream exiting nozzle 15, 55 and flowing over and under the wing 17 to remain attached to the wing surface without separation and stalling over a much greater range of angles of attack, and to a substantially higher angle of attack with respect to the wing chord, than is possible without such deflectors. This feature affords the builder a degree of flexibility in design unknown in prior art devices of this type, and results in an apparatus capable of producing a lifting force much greater than the theoretical maxim calculated or specified for the wing airfoil.

A third function is to operate on the fluid in some manner as it exits the nozzle so as to impart to the outflowing fluid an energy and a trajectory that allow it to sustain a higher velocity with resulting noticeably greater wing lift than can be achieved with a similarly sized nozzle without a deflector.

Yet another function is to eliminate, or at least substantially reduce the rotational moment induced in the fluid exiting the nozzle. Without deflectors of the type described, the departing fluid stream follows a spiral path or vortex downstream of the nozzle. This result is a substantial reduction in the lift produced by the fluid impacting and flowing over and under the wing. The deflector counteracts this phenomenon and allows the energy that would otherwise be dissipated in the production of the vortex to be translated into lift. The result is greatly enhanced efficiency, with virtually no offsetting deficiency or penalty.

The operation and advantages of the invention will be readily apparent from the foregoing description. It should be understood, however, that although the invention has been disclosed in terms of the specific constructions and functions shown in the drawings and described in the specification, it is not to be construed as limited to those embodiments. They are to be regarded is illustrative rather than restrictive. This is particularly true with respect to the geometric configurations depicted in the several figures of the drawings and to the dimensions and dimensional relationships embodied in the aforementioned mathematical model of the invention. The specification is intended to encompass any and all variations and equivalents of the examples chosen for purposes of the disclosure, which do not depart from the spirit and scope of the following claims.

What is claimed is:

1. In a device for generating a force, comprising:
a body having a narrow end and an enlarged end and an outwardly-flared wall; a first shroud mounted to said body and having a portion thereof coextensive with at least a portion of the wall, the portion of the said first shroud coextensive with said wall terminating in a lip and the coextensive portions of the said first shroud and the wall forming an outwardly-flaring duct having a fluid inlet and a fluid outlet, the inlet flow area of the fluid inlet of the duct being greater than the outlet flow area of the fluid outlet of the duct, whereby the duct defines a nozzle accelerating a stream of fluid flowing through the duct; a source of fluid under pressure effectively connected to the fluid inlet of the duct; and a vane having a leading edge, a trailing edge, a cambered top surface, and a bottom surface, the vane mounted to the duct with the leading edge positioned adjacent the fluid outlet of the duct and in the flow path of accelerated fluid discharged through the fluid outlet;
the improvement comprising a pressure dam on the bottom surface of the vane positioned in the flow path of, and entrapping a portion of the accelerated fluid discharged through the fluid outlet flowing adjacent the bottom surface of the vane.

2. The improvement defined by claim 1, wherein the pressure dam comprises a flange depending from the bottom surface of the vane in a region adjacent the trailing edge of the vane.

3. The improvement defined by claim 2, wherein the flange is substantially perpendicular to the bottom surface of the vane and extends about 0.5 to about 0.75 of the length of the chord of the vane from the bottom surface of the vane.

4. The improvement defined by claim 1, comprising a first deflector projecting outwardly of said body and extending transversely of the fluid outlet of the first duct.

5. The improvement defined by claim 4, wherein the first deflector has a depth of from about 0.25 to about 0.5 of the depth of said first duct at its fluid outlet.

6. The improvement defined by claim 1, comprising a second deflector formed on the lip of the said first shroud and extending transversely of the fluid outlet of the duct.

7. The improvement defined by claim 4, comprising a second deflector formed on the lip of the said first shroud and extending transversely of the fluid outlet of the duct.

8. The improvement defined by claim 1, comprising a second shroud mounted to, and having a portion thereof coextensive with at least a portion of, the first shroud, the first and second shrouds forming an outwardly-flaring second duct having a fluid inlet and a fluid outlet, the inlet flow area of the fluid inlet of the second duct being greater than the flow area of the fluid outlet of the second duct, the second duct defining a nozzle accelerating a stream of fluid flowing through the second duct and directing a stream of accelerated fluid against the bottom surface of the vane.

9. The improvement defined by claim 7, comprising a second shroud mounted to, and having a portion thereof coextensive with at least a portion of, the first shroud, the first and second shrouds forming an outwardly-flaring second duct having a fluid inlet and a fluid outlet, the inlet flow area of the fluid inlet of the second duct being greater than the flow area of the fluid outlet of the second duct, the second duct defining a nozzle accelerating a stream of fluid flowing through the second duct, and directing a stream of accelerated fluid against the bottom surface of the vane.

10. A device for generating a force, comprising:
   a body having a narrow end and an enlarged end and an outwardly-flared wall;
   a first shroud mounted to said body and having a portion thereof coextensive with at least a portion of the wall, the portion of the said first shroud coextensive with the wall terminating in a lip and the coextensive portions of the said first shroud and the wall forming an outwardly-flaring duct having a fluid inlet and a fluid outlet, the inlet flow area of the fluid inlet of the duct being greater than the outlet flow area of the fluid outlet of the duct, whereby the duct defines a nozzle accelerating a stream of fluid flowing through the duct;
   a source of fluid under pressure effectively connected to the fluid inlet of the duct; and
   a vane having a leading edge, a trailing edge, a cambered top surface, and a bottom surface, the vane being mounted to the duct with the leading edge positioned adjacent the fluid outlet of the duct and in the flow path of accelerated fluid discharged through the fluid outlet; and
   a pressure dam positioned on the bottom surface of the vane in the flow path of, and entrapping a portion of the accelerated fluid discharged through the fluid outlet and flowing adjacent the bottom surface of the vane.

11. The device defined by claim 10, wherein the pressure dam comprises a flange depending from the bottom surface of the vane in a region adjacent the trailing edge of the vane.

12. The device defined by claim 11, wherein the flange is substantially perpendicular to the bottom surface of the vane and extends about 0.5 to about 0.75 of the length of the chord of the vane from the bottom surface of the vane.

13. The device defined by claim 10, comprising a first deflector projecting outwardly of said body and extending transversely of the fluid outlet of the first duct.

14. The device defined by claim 13, wherein the first deflector has a depth of from about 0.25 to about 0.5 of the depth of said first duct at its fluid outlet.

15. The device defined by claim 10, comprising a second deflector formed on the lip of the said first shroud and extending transversely of the fluid outlet of the duct.

16. The device defined by claim 13, comprising a second deflector formed on the lip of the said first shroud and extending transversely of the fluid outlet of the duct.

17. The device defined by claim 10, comprising a second shroud mounted to, and having a portion thereof coextensive with at least a portion of, the first shroud, the first and second shrouds forming an outwardly-flaring second duct having a fluid inlet and a fluid outlet, the inlet flow area of the fluid inlet of the second duct being greater than the flow area of the fluid outlet of the second duct, the second duct defining a nozzle accelerating a stream of fluid flowing through the second duct and directing a stream of accelerated fluid against the bottom surface of the vane.

18. The device defined by claim 16, comprising a second shroud mounted to, and having a portion thereof coextensive with at least a portion of, the first shroud, the first and second shrouds forming an outwardly-flaring second duct having a fluid inlet and a fluid outlet, the inlet flow area of the fluid inlet of the second duct being greater than the flow area of the fluid outlet of the second duct, the second duct defining a nozzle accelerating a stream of fluid flowing through the second duct and directing a stream of accelerated fluid against the bottom surface of the vane.

19. For use in a device for generating a force, comprising:
   a body having a narrow end and an enlarged end and an outwardly-flared wall; a first shroud mounted to said body and having a portion thereof coextensive with at least a portion of the wall, the portion of the said first shroud coextensive with the wall terminating in a lip and the coextensive portions of the said first shroud and the wall forming an outwardly-flaring duct having a fluid inlet and a fluid outlet, the inlet flow area of the fluid inlet of the duct being greater than the fluid outlet flow area of the fluid outlet of the duct whereby the duct defines a nozzle accelerating a stream of fluid flowing through the duct; a source of fluid under pressure effectively connected to the fluid inlet of the duct; and a vane having a leading edge, a trailing edge, a cambered top surface, and a bottom surface, the vane mounted to said first duct with the leading edge positioned adjacent the fluid outlet of the duct and in the flow path of accelerated fluid discharged from duct through the fluid outlet;
   a method for increasing the lift generated by the vane, comprising:
      providing a pressure dam on the bottom surface of the vane positioned in the flow path of, and entrapping a portion of the accelerated fluid discharged through the fluid outlet flowing adjacent the bottom surface of the vane;
      providing a first deflector projecting outwardly of the body and extending transversely of the fluid outlet of the duct; and
      providing a second deflector formed on the lip of the said first shroud and extending transversely of the fluid outlet of the duct.

20. The method defined by claim 19, comprising providing a second shroud mounted to, and having a portion thereof coextensive with at least a portion of, the first shroud, the first and second shrouds forming an outwardly-flaring second duct having a fluid inlet and a fluid outlet, the inlet flow area of the fluid inlet of the second duct being greater than the outlet flow area of the fluid outlet of the second duct, the second duct defining a nozzle accelerating a stream of fluid flowing through the second duct and directing the stream of accelerated fluid against the bottom surface of said vane.

21. A vehicle having means for generating a force, comprising:
   a body having a narrow end and an enlarged end and an outwardly-flared wall;
   a first shroud mounted to said body and having a portion thereof coextensive with at least a portion of the wall, the portion of the said first shroud coextensive with the wall terminating in a lip and the coextensive portions of the said first shroud and the wall forming an outwardly-flaring duct having a fluid inlet and a fluid outlet, the inlet flow area of the fluid inlet of the duct being greater than the fluid outlet flow area of the fluid outlet of the duct, the duct defining a nozzle accelerating a stream of fluid flowing through the duct;
   a vane having a leading edge, a trailing edge, a cambered top surface, and a bottom surface, said vane mounted to the duct with the leading edge positioned adjacent the fluid outlet of the duct and in the flow path of accelerated fluid discharged from the duct through the fluid outlet;

a pressure dam on the bottom surface of said vane positioned in the flow path of, and entrapping a portion of the accelerated fluid discharged through the fluid outlet flowing adjacent the bottom surface of the vane;

a first deflector projecting outwardly of said body and extending transversely of the fluid outlet of the duct; and a source of fluid under pressure effectively connected to the fluid inlet of the duct.

22. The vehicle defined by claim 21, comprising a second deflector, formed on the lip of the said first shroud and extending transversely of the fluid outlet of the duct.

23. The vehicle defined by claim 21, comprising a second shroud mounted to, and having a portion thereof coextensive with at least a portion of, the first shroud, the first and second shrouds forming an outwardly-flaring second duct having a fluid inlet and a fluid outlet, the inlet flow area of the fluid inlet of the second duct being greater than the outlet flow area of the fluid outlet of the second duct, the second duct defining a nozzle accelerating a stream of fluid flowing through the second duct and directing the stream of accelerated fluid against the bottom surface of said vane.

24. The vehicle defined by claim 22, comprising a second shroud mounted to, and having a portion thereof coextensive with at least a portion of, the first shroud, the first and second shrouds forming an outwardly-flaring second duct having a fluid inlet and a fluid outlet, the inlet flow area of the fluid inlet of the second duct being greater than the outlet flow area of the fluid outlet of the second duct, the second duct defining a nozzle accelerating a stream of fluid flowing through the second duct and directing the stream of accelerated fluid against the bottom surface of said vane.

* * * * *